United States Patent [19]

Kunert

[11] Patent Number: 4,938,521

[45] Date of Patent: Jul. 3, 1990

[54] SPACER FOR VEHICLE WINDSHIELD

[75] Inventor: Heinz Kunert, Cologne, Fed. Rep. of Germany

[73] Assignee: Saint Gobain Vitrage, Courbevoie, France

[21] Appl. No.: 242,387

[22] Filed: Sep. 9, 1988

[30] Foreign Application Priority Data

Sep. 10, 1987 [DE] Fed. Rep. of Germany ....... 3730345

[51] Int. Cl.$^5$ .............................................. B60R 13/06
[52] U.S. Cl. .................................. 296/96.21; 52/208; 52/400; 156/108
[58] Field of Search ............... 296/93, 201, 84.1, 96.2, 296/96.21; 52/208, 397, 400; 156/108

[56] References Cited

U.S. PATENT DOCUMENTS

| | | | |
|---|---|---|---|
| 3,779,794 | 12/1973 | De Santis | 156/329 X |
| 4,433,010 | 2/1984 | Pedain et al. | 427/160 |
| 4,551,372 | 11/1985 | Kunert | 428/38 |
| 4,571,278 | 2/1986 | Kunert | 296/201 |
| 4,606,159 | 8/1986 | Kunert | 52/208 |
| 4,648,222 | 3/1987 | Miyata et al. | 296/93 X |
| 4,681,794 | 7/1987 | Kunert et al. | 296/93 X |
| 4,839,122 | 6/1989 | Weaver | 264/129 |

FOREIGN PATENT DOCUMENTS

| | | | |
|---|---|---|---|
| 3447271 | 6/1986 | Fed. Rep. of Germany | 296/93 |
| 3536806 | 4/1987 | Fed. Rep. of Germany . | |
| 58509 | 4/1982 | Japan | 296/93 |
| 163818 | 7/1987 | Japan | 296/93 |

OTHER PUBLICATIONS

EP 24,501, 9/1980, Schwebel et al.
EP 121,480, 10/1984, Kunert et al.

Primary Examiner—Charles A. Marmor
Assistant Examiner—Michael Mar
Attorney, Agent, or Firm—Pennie & Edmonds

[57] ABSTRACT

A spacer for installation along the upper or lower horizontal edge of a vehicle windshield. The spacer is used to maintain the support bracket at a predetermined distance and perpendicular to the surface of the windshield. The spacer includes a first surface for contact with the windshield edge, a second surface for contact with the bracket, and a support surface which works a support element fastened to the bracket for maintaining the bracket substantially perpendicular to the edge of the windshield. The windshield, equipped with the spacer, can thus be positioned by itself by simple alignment of the spacer on the bracket support element while an adhesive is applied between the windshield and bracket and cures without further support.

20 Claims, 4 Drawing Sheets

SPACER FOR VEHICLE WINDSHIELD

TECHNICAL FIELD

This invention relates to a vehicle window comprising a window opening on one side with a peripheral sheet of metal parallel to the glazing and onto which the glazing is mounted by gluing by means of an adhesive bead, with the glazing being equipped with a plastic spacer which is extruded or shaped as a frame. The spacer is provided with at least one peripheral portion or wing perpendicular to the surface of the glazing for engaging a corresponding support element of the sheet of metal.

BACKGROUND ART

The technique of mounting automobile glazings onto a sheet metal bracket by gluing, without intermediary components, is often called "direct gluing".

Automobile glazings which are intended for direct gluing are generally equipped with a coating of a hot paint or an enamel which is opaque to light and ultraviolet rays. This coating is applied on the edge of the windshield on the glazing surface directed towards the sheet metal bracket and serves to protect the bead of glue from the action of ultraviolet rays and to prevent the bead from being visible through the glazing from the outside.

Further, instead of the coating or, in addition to it, there are automobile glazings used for direct gluing which utilize a plastic component placed in advance on the marginal portions of the glazing. Alternatively, there are glazings used for direct gluing which are equipped on their periphery with a plastic component having a wing directed toward the sheet metal bracket and perpendicular to the surface of the glazing (see, for example, EP No. 121,481). This wing is always located on the margin of the component toward the inside of the windshield and thus serves only to limit the lateral overflow of the adhesive compound or glue used during the installation of the glazing in the window opening or bay of a vehicle.

With direct gluing, the glazings must be positioned precisely relative to the rabbet of the window opening of the vehicle body. The space remaining between the edge of the glazing and the edge of the rabbet should be constant since the imposed minimal requirement makes it necessary to have an upper horizontal groove which has a constant given width. In many cases, the lower edge of the glazing of both the windshield and the rear window is hidden behind the elements of the body and only the upper groove is visible. In direct gluing, it is necessary to hold the glazing mechanically in the window opening until the bead of glue sets and is hard enough to resist deformation under the weight of the glazing. Otherwise, the glazing would move so that the upper horizontal groove would not meet the acceptable tolerances.

Several methods are known for temporarily fastening the glazing during the setting time of the glue; for example, it is possible to glue bendable metal straps to the periphery of the glazing. After gluing of the glazing, these straps are bent back into the rabbet. This method requires a precise positioning of the glazing in the rabbet and further demands additional manual work to bend all the straps at the end of the operation, and is illustrated in U.S. Pat. No. 4,606,159.

The object of the invention is a labor-saving solution for positioning and fastening an automobile windshield to a support bracket by the direct gluing method. This solution guarantees, at a minimum, that the upper and/or lower horizontal groove between the edge of the glazing and the edge of the rabbet has a definite and uniform width and that the glazing and bracket are immobilized in the bay in the appropriate position.

SUMMARY OF THE INVENTION

According to the invention, this object is achieved by positioning a spacer along the upper and/or lower edge of the glazing at a given constant distance from the edge of the rabbet of the window opening and by providing the spacer with a peripheral portion having a support surface intended to support the weight of the glazing directed in the plane of the window opening. The support surface is working in combination with a support element of the upper and/or lower sheet metal bracket, the ends of which are directed approximately perpendicular to the plane of the vehicle window opening.

According to the invention, the spacer, which is securely bonded to the edge of the glazing, is provided with a peripheral portion of specific dimensions and a section which has a predetermined configuration such that it can perform the support function without separate external or combined supporting means. Instead of being positioned relative to the edge of the glazing, the peripheral portion of this spacer is positioned at a determined distance relative to the rabbet of the window opening which is opposite to it. Thus, it is seen that, unlike the known methods, this spacer equipped with its peripheral portion makes it possible to position the glazing relative to the upper and/or lower horizontal part of the window opening. Further, according to the invention, the rabbet acts directly or indirectly as support for the peripheral portion of the spacer. Therefore, a device is achieved which makes it possible to position and fasten the glazing in a particularly simple and effective manner using minimal labor.

BRIEF DESCRIPTION OF THE DRAWINGS

Further benefits and advantages of the invention will become apparent from a consideration of the following description given with reference to the accompanying drawings figures which specify and show preferred embodiments of the invention, and wherein.

DETAILED DESCRIPTION OF THE PREFERRED EMBODIMENTS

Figure 1:
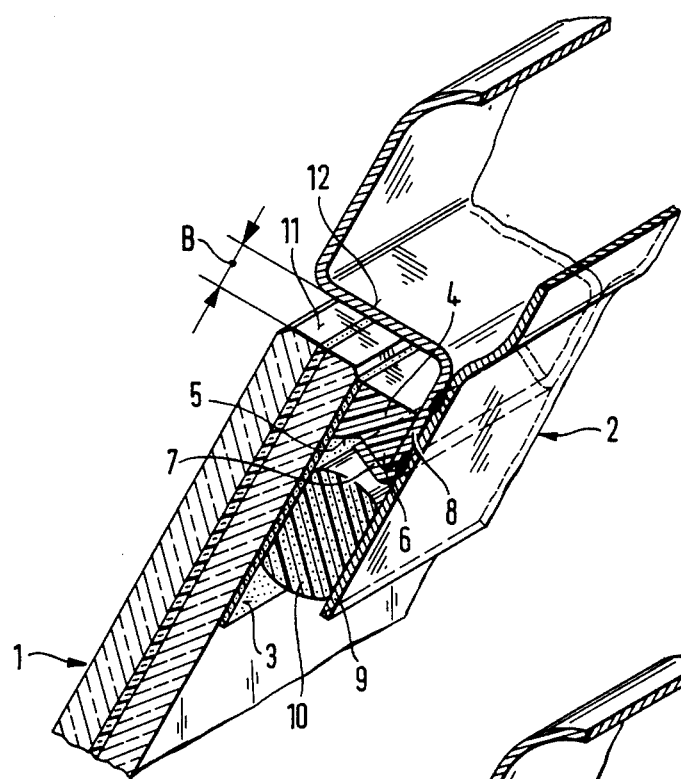
FIG. 1 is a perspective view, partially in cross section, of a first spacer and bracket for the top of a windshield.

In its simplest embodiment, the glazings is equipped with the spacer which has a peripheral portion making it possible to position and fasten the glazing only along its upper or lower edge. After deposit of the bead of glue on the edge of the glazing or on the rabbet of the window opening, the glazing is suspended in the window opening, that is, the peripheral portion of the spacer first comes in contact with the support surface of the rabbet. Next, the glazing is symmetrically adjusted in the window opening, that is, moved until its two lateral grooves have the same width. In a latter phase the glazing is applied over its entire margin to the sheet metal bracket. The weight of the glazing supplies pressure to the sheet metal bracket to maintain the bead of glue between the glazing and the sheet metal bracket in its pressed position.

In a development of the invention, the spacer, equipped with a peripheral portion, is also placed along the lateral edges of the glazing. The lateral sections of the spacer serve to automatically, laterally adjust the position of the glazing. In this case, the peripheral portions of the spacer are dimensioned and placed so that they can rest on a part of the rabbet which is perpendicular to the sheet metal bracket, for example, at the periphery of the rabbet. Here, the lateral peripheral portion of the spacer should be placed so that it can rest in the rabbet without any motion. Preferably, the lateral peripheral portions of the spacer are flexible so that when the glazing is placed in the window opening, they can deform laterally.

In another embodiment, besides an adjustment in the plane of the glazing, an adjustment can be made in the perpendicular direction. This is particularly advantageous when it is desired to obtain, for streamlining the vehicle, a continuity between the glazing and the surface of the body which surrounds it. To allow an automatic depth adjustment, the spacer is equipped with wedges and slots which, during mounting, work with complementary slots or wedges placed on the sheet metal bracket to create a continuity between the glazing and body. Obviously, it is necessary to have placed these wedges or slots relative to the part of the body which surrounds the window opening so that at the moment of assembly of the wedges in the slots there is obtained, by the very design of the unit, a continuity between the outside surfaces of the glazing and the body.

In all of the cases shown, the glazings are equipped with a plastic spacer which is glued on the inside surface of the glazing opposite the sheet metal bracket. This spacer can be preformed as described in patent application DE- No. 3,536,806. A particularly advantageous manner for making this spacer consists of extruding it simultaneously with its deposit directly onto the surface of the glazing using a nozzle with an adapted cross-section. In this case, the material is an adhesive compound that sets. This extrusion technique and the corresponding adhesive compounds are known. The materials most suited for such an extrusion are single-component polyurethane prepolymers in paste form. Actual setting takes place under the action of the humidity of the air and generates high-modulus elastomers. Such polyurethane systems are described in the U.S. Pat. No. 3,779,794. Also, two-component polyurethane systems can be suitable; those presented in European patent application EP No. 83,797 or in European patent EP No. 24,501 are suitable. Depending on the nature of the adhesive compound, it is necessary to prepare the surface on which the spaced bead will be deposited in a known manner, optionally with a suitable adherence primer.

To make the spacer on the glazing it is possible to use an extrusion head which is guided along the edge of the glazing at a defined distance. This can be done with a mechanical device which keeps the distance from the edge of the glazing constant. Guiding of the extrusion head along the periphery of the glazing, however, can be performed by a robot programmed accordingly or by another programmable machine without the necessity for it to be placed directly in reference to the edge of the glazing. This last method offers the advantage that the application of the spacer to the glazing is independent of the edge of the glazing and depends only on the shape and dimensions of the window opening and its own design. Thus, the distance between the spacer and the horizontal upper edge of the glazing can be different from the distance between the spacer and the lateral edges.

The drawing portions show a laminated glazing of the type generally used in automobile windshields. It would also be possible to use a monolithic glazing or even a glazing consisting of another glass/plastic combination.

FIG. 1 shows a first embodiment of a vehicle window according to the invention. Glazing 1 is equipped along its edge on the face opposite sheet metal bracket 2 with an opaque coating 3 in the form of a frame. This coating 3 consists of a hot enamel.

Along the upper edge a spacer 4, made by extrusion of an adhesive compound, has been placed on coating 3 and strongly adheres to it. The section of spacer 4 is approximately rectangular. On its lower edge 5, spacer 4 has a protuberance 6. Beneath this protuberance 6 is angle 7 of sheet metal 8. This angle, along with the sheet metal bracket 9, constitutes the edge of opening 2 of the window. The design of lower surface 5 of the spacer and the inclination of angle 7 of the sheet metal are such that, as the glazing is positioned, a force is introduced in the direction of the sheet metal bracket. This inclination is less than 90° with respect to the bracket. In other areas of the periphery of the glazing there also exists a component of force that is directed toward the sheet metal bracket. This component results from the weight of the glazing. These components are sufficient, when glazing 1 is positioned, for a pressure to be exerted on the bead of glue 10. Spacer 4 and sheet metal angle 7 are placed relative to sheet metal bracket 2 and to glazing 1 such that the groove which exists between periphery 11 of glazing 1 and edge 12 of the rabbet of the window opening has a constant width B in the upper part of the periphery of the glazing.

Figure 2:
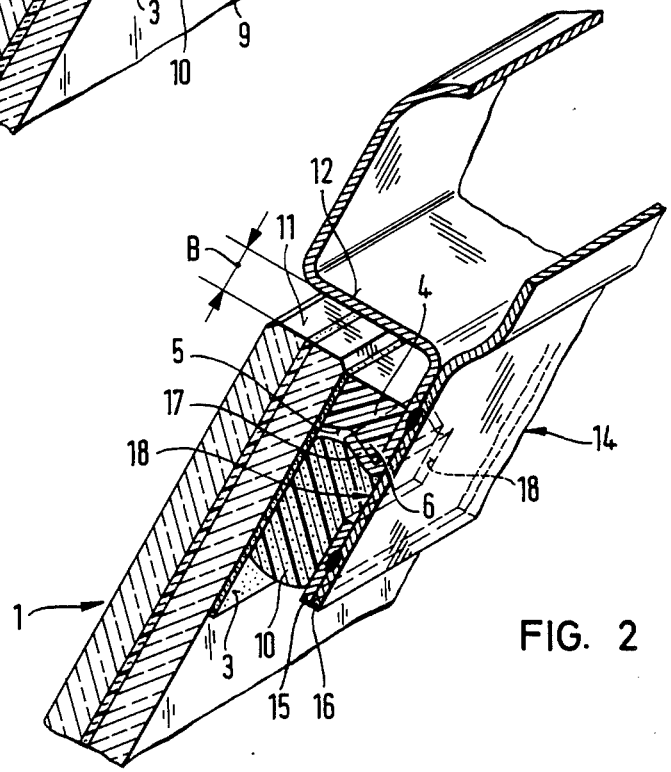
FIG. 2 is a perspective view, partially in cross section, of the spacer of FIG. 1 used with a modified bracket.

The embodiment shown in FIG. 2 consists of a spacer 4 placed on glazing 1 and which has approximately the same form and same section as in the embodiment of FIG. 1. Sheet metal bracket 14 consists of two unit pieces of sheet metal 15 and 16 which are straight. Here the support surface for spacer 4 consists of sheet metal angle 17 which is obtained by stamping sheet metal 15 on three sides and then by bending. Opening 18 thus made in the section of sheet metal 15 is closed and made tight by penetration of adhesive compound 10.

Figure 3:
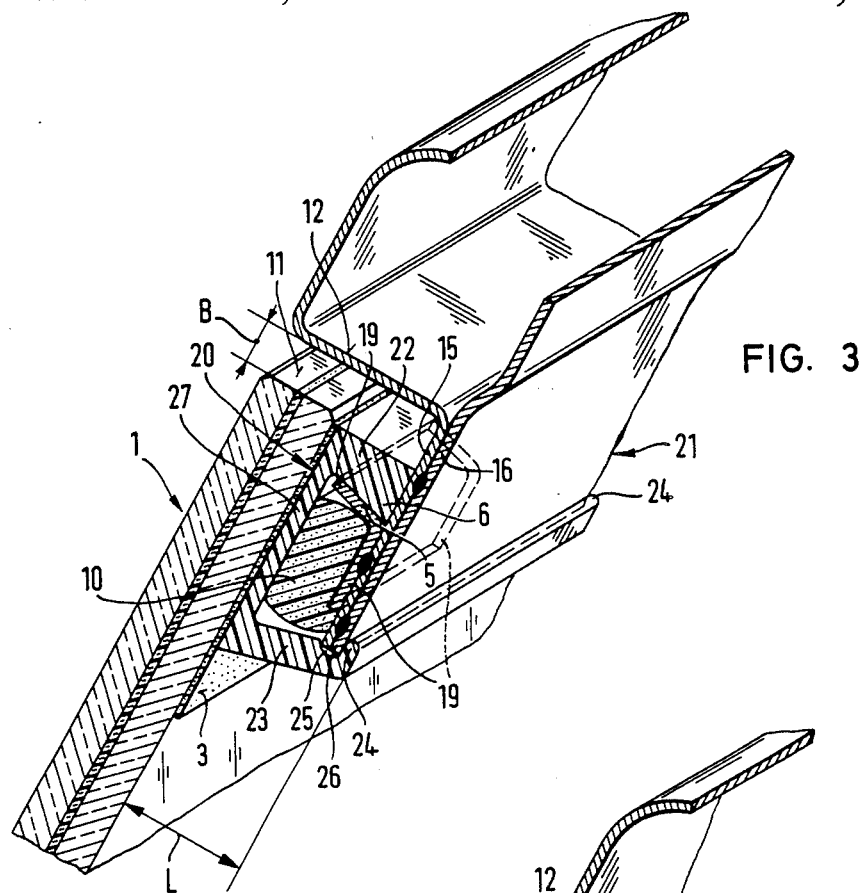
FIG. 3 is a perspective view, partially in cross section, of a second spacer and bracket for the top of a windshield.

FIG. 3 shows an embodiment in which glazing 1 is equipped with a spacer 20, which by its interaction with sheet metal bracket 21, allows a positioning and fastening of glazing 1 in three dimensions. Spacer 20 has approximately the form of a U consisting of a central part 27, of a first outer peripheral portion 22 and an inner peripheral portion 23. Outer peripheral portion 22 has the same form and performs the same function as spacer 4 of the embodiments described above.

The outer peripheral portion interacts along the entire upper edge of the glazing with the sheet metal piece 19 which has the form of an inverted angle or a hook. This inverted angle or hook 19 is a separate piece which is attached to the sheet metal bracket 21 by spot welds. The inner peripheral portion 23 of spacer 20 has a length L which is greater than the distance between the surface of the glazing and the sheet metal bracket 21. The outer face of the inner peripheral portion 23 is equipped with a lip 24 and a groove 25. The peripheral portion 23 acts like a spring which deforms elastically during the introduction of the glazing so that the edge of the sheet metal bracket 26 may be positioned into the groove 25 where it is then fastened. The use of this inner peripheral portion provides a symmetrical centering of the glazing.

Figure 4:
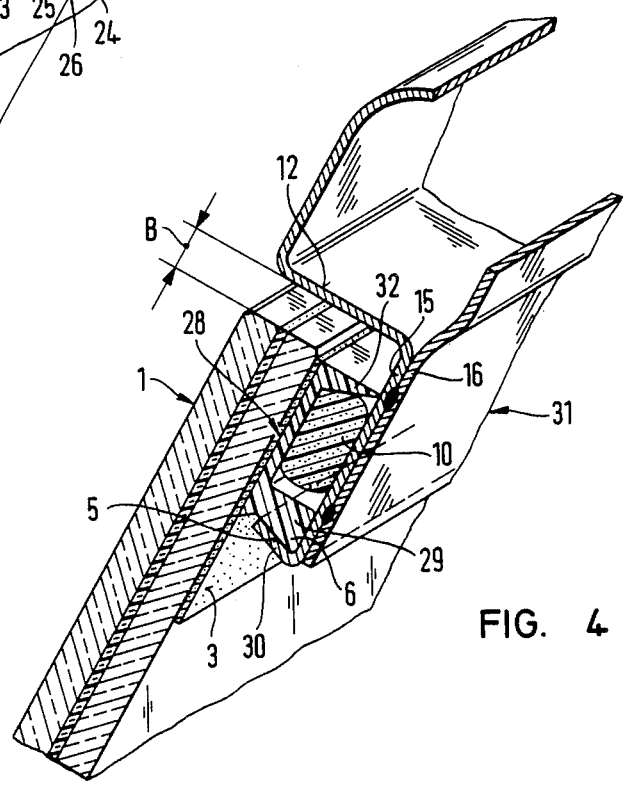
FIG. 4 is a perspective view, partially in cross section, of a third spacer and a bracket for the top of a windshield.

The embodiment shown in FIG. 4 also features a spacer 28 whose section is approximately in the form of a U. In this embodiment the weight of the glazing 1 is supported by the inner peripheral portion 29 of the spacer resting on the angle 30 of the sheet metal bracket 21. Instead of an angle 30, it would also be possible to use a support element in the form of a hook or an inverted angle which would then be fastened to the sheet metal bracket 31. Spacer 28 also has an outer peripheral portion 32 which is approximately perpendicular to the surface of the glazing. This peripheral portion 32 has a section which is substantially triangular and acts as a support for the adhesive compound 10.

Figure 5:
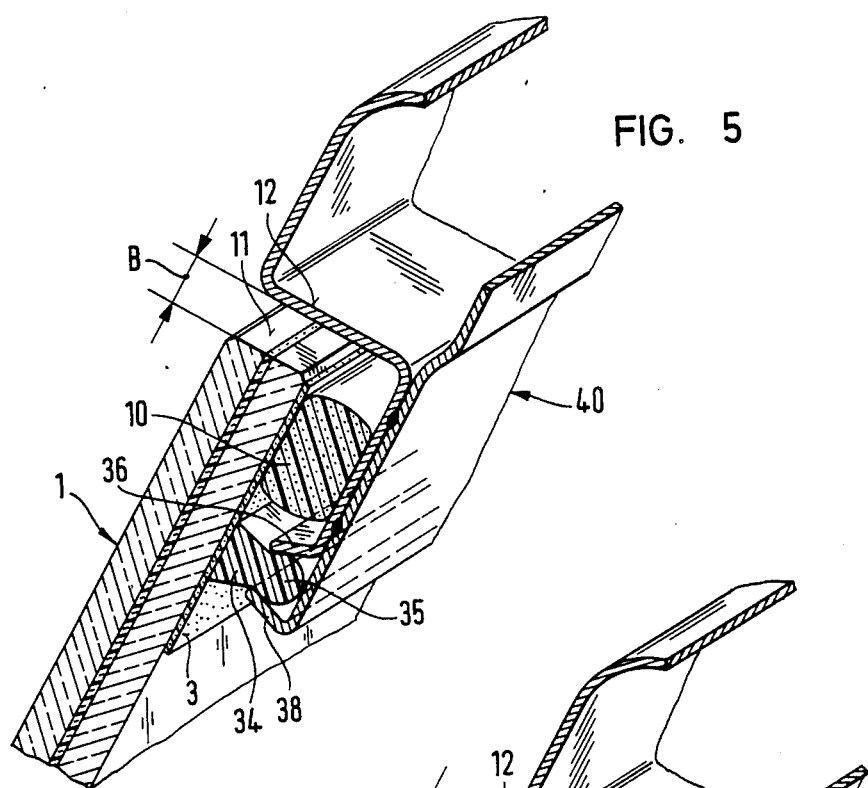
FIG. 5 is a perspective view, partially in cross section, of a fourth spacer and a bracket for the top of a windshield.

FIG. 5 represents an embodiment in which the glazing 1 is equipped with key hole shaped spacer 34 along the upper edge. The bulbous portion 35 of the spacer 34 is enclosed within two metal angles 36 and 38 which are formed from the ends of sheet metal bracket 40. The enclosure of the bulbous portion 35 within these angles establishes an attachment of the glazing to the sheet metal bracket which may be defined along a portion of the periphery or over the entire periphery. The bead of glue 10 sets to provide a permanent attachment of the glazing 1 to the sheet metal bracket 40.

Figure 6:
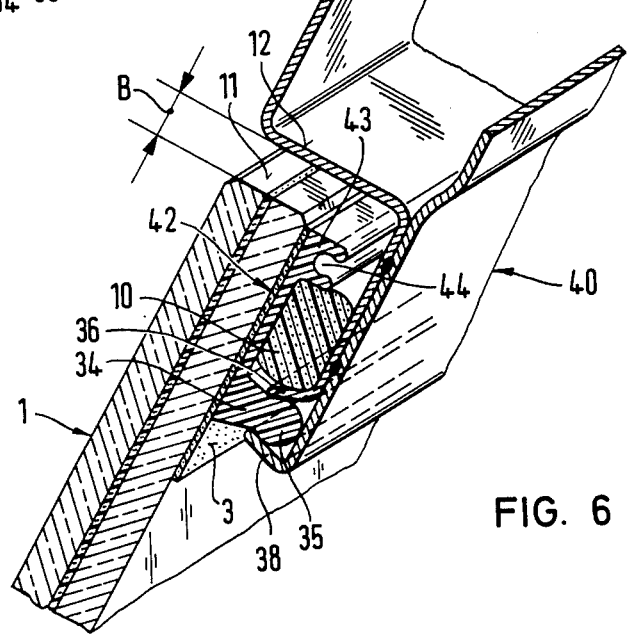
FIG. 6 is another perspective view of an alternate shape for spacer of FIG. 5 for use with a shear cord.

The embodiment represented in FIG. 6 shows the device for positioning and fastening the glazing 1 in a manner which is close to the preceding examples. In this case, the peripheral portion 34 comprises a bulbous portion 35 which works within a channel formed by the angles 36 and 38 of the sheet metal bracket 40. The peripheral portion 34 is the inner portion of a spacer 42 which is substantially a U section. The outer peripheral portion 43 comprises a groove 44 into which a cord having high tensile strength can be introduced. If necessary, the cord can be used to shear the bead of glue 10 and the inner peripheral portion 34 of the spacer to facilitate the dismounting of the glazing.

Figure 7:
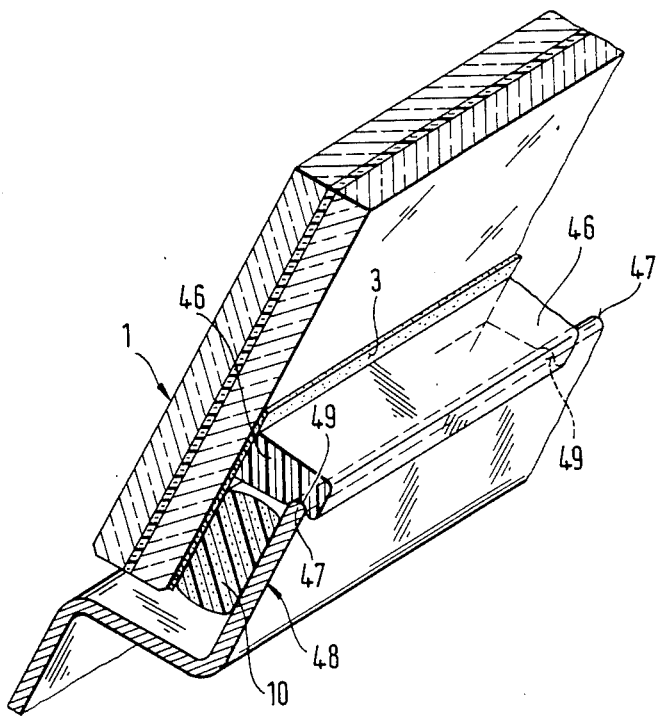
FIG. 7 is a perspective view, partially in cross section, of a first spacer and bracket, according to the invention, for the bottom of a windshield.

FIG. 7 shows a section of an embodiment in the lower part of a window opening. Here the spacer 46 is placed along the lower edge of glazing 1 and serves as a rigid support bonded to the glazing. The spacer 46 will rest on the upper edge 47 of sheet metal bracket 48. Also, spacer 46 is equipped along its lower face with a groove 49 in which the upper edge 47 of sheet metal bracket 48 becomes engaged. The immobilization achieved by spacer 46 lasts at least as long as is necessary for the bead of glue 10 to set.

Figure 8:
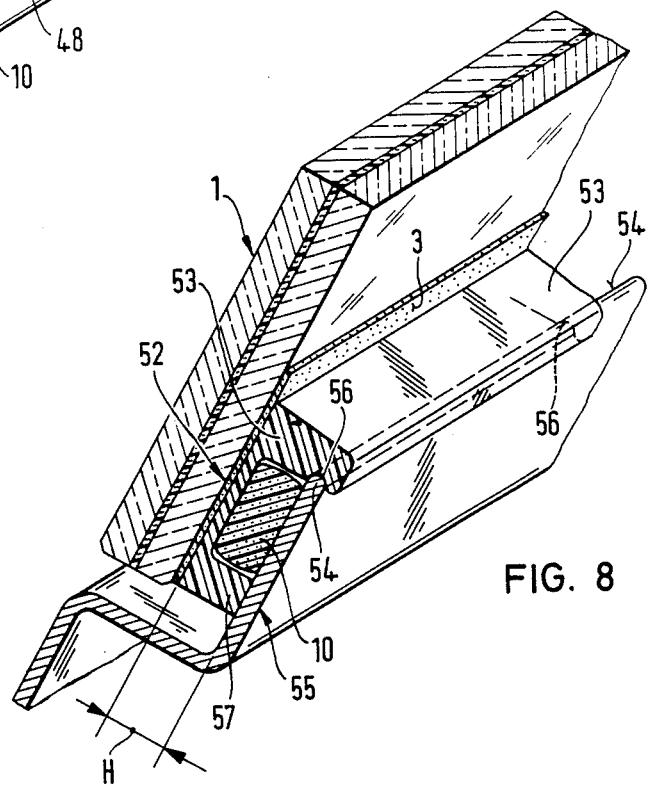
FIG. 8 is a perspective view, partially in cross section, of a second spacer and bracket for the bottom of a windshield.

FIG. 8 shows an embodiment in which glazing 1 is equipped with a spacer 52, which, when placed over the entire periphery, achieves a positioning in three dimensions through its interaction with the sheet metal bracket 55. The edge 54 of sheet metal bracket 55 is inserted into the groove 56 of the inner peripheral portion 53 in such a way as to achieve precise positioning of the glazing within its plane. The outer peripheral portion 57 has a height H which corresponds to the desired distance between the glazing and the sheet metal bracket 55. This peripheral portion functions as a stop during placement of the glazing into the window opening. Thus, the bead of glue 10 is pressed on by the glazing in the direction of the sheet metal bracket 55 to the limit established by the peripheral portion involved. Therefore, a precise positioning of the glazing in the direction perpendicular to its surface is also obtained.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A vehicle window comprising a glazing; a peripheral sheet metal bracket attached to a vehicle and oriented parallel to the edges of the glazing, said bracket including a support element attached thereto; and a spacer attached to the periphery of the glazing on at least one edge adjacent the bracket for supporting the weight of the glazing and for maintaining the bracket at a predetermined uniform distance away from said glazing, said spacer being provided with a lower peripheral portion having a recess with a cross sectional configuration forming a support surface for contacting said support element on said bracket, said support element being positioned within said recess at an inclined angle so that, as the glazing is positioned on the bracket, the support surface of the spacer contacts the support element and the weight of the glazing exerts a force which directs the glazing toward the bracket.

2. The window according to claim 1, wherein said support element is made by the deformation of an end of the bracket oriented toward the glazing.

3. The window according to claim 1, wherein the support element comprises an inverted angle or hook fastened to the bracket.

4. The window according to claim 1 wherein the spacer comprises a second peripheral portion extending along the edge of the glazing whose length and position on the glazing are defined such that it rests, optionally by elastic deformation, in continuous contact with the edge of the bracket.

5. The window according to claim 4, wherein said second peripheral portion includes a groove.

6. The window according to claim 1 wherein the bracket further comprises a second support element, said support elements forming a channel for surrounding the peripheral portion of the spacer.

7. The window of claim 6 wherein the peripheral portion of the spacer has a bulbous shape which substantially fills the channel of the bracket.

8. The window according to claim 1, wherein the spacer further comprises means for receiving a shear cord.

9. The window according to claim 1, wherein the spacer is obtained by extrusion and subsequent curing of a viscous adhesive compound directly onto the surface of the glass.

10. The window of claim 1 wherein the support element forms an angle of inclination of less than 90° with respect to the bracket.

11. The window of claim 1 wherein the glazing includes a coating along its edge beneath the spacer.

12. The window of claim 1 wherein the bracket includes two layers of metal and the support element is formed from the metal layer closest to the spacer, thus leaving an opening in said closest metal layer for reception of an adhesive.

13. The window of claim 1 wherein said support element is made from a separate member which is attached to and forms part of said bracket.

14. The window of claim 1 wherein said spacer and bracket form an enclosure for an adhesive.

15. The window of claim 14 wherein said spacer includes a second peripheral portion having a lip portion which engages the lower end of said bracket.

16. The window of claim 1 further comprising a bead of adhesive for joining said glazing to said bracket.

17. A vehicle window comprising a glazing; a peripheral sheet metal bracket attached to a vehicle and oriented parallel to the edges of the glazing, said bracket including a support element attached thereto and extending the length of said bracket; a coating along the edge of said glazing opposite said bracket; a spacer attached to the periphery of the glazing on at least one edge adjacent the bracket for supporting the glazing and for maintaining the bracket at a predetermined uniform distance away from said glazing, said spacer being provided with a lower peripheral portion having a recess with a cross sectional configuration forming a support surface for contacting said support element on said bracket, said support element being positioned within said recess at an inclined angle; and a bead of adhesive for joining said bracket and glazing.

18. The window of claim 17 wherein the support element forms an angle of inclination of less than 90° with respect to the bracket.

19. A vehicle window comprising a glazing; a peripheral sheet metal bracket attached to a vehicle and oriented parallel to the edges of the glazing, said bracket including a support element attached thereto and extending the length of the bracket; a coating along the edge of said glazing opposite said bracket; a spacer attached to the periphery of the glazing on at least one edge adjacent the bracket for supporting the weight of the glazing and for maintaining the bracket at a predetermined uniform distance away from said glazing, said spacer being provided with a lower peripheral portion having a recess with a cross sectional configuration forming a support surface for contacting said support element on said bracket said support element being positioned within said recess at an inclined angle; and a bead of adhesive for joining said bracket and glazing, said support element extending along a portion of said bracket, and said spacer including a second peripheral portion having a lip portion which engages the lower edge of said bracket, and a third portion which contacts said glazing coating and connects said spacer peripheral portions.

20. The window of claim 19 wherein the support element forms and angle of inclination of less than 90° with respect to the bracket.

* * * * *